May 23, 1961 K. TRIPPEL 2,985,144
SERVO SYSTEM
Filed March 26, 1956 3 Sheets-Sheet 1

INVENTOR.
KARL TRIPPEL
BY

INVENTOR
KARL TRIPPEL

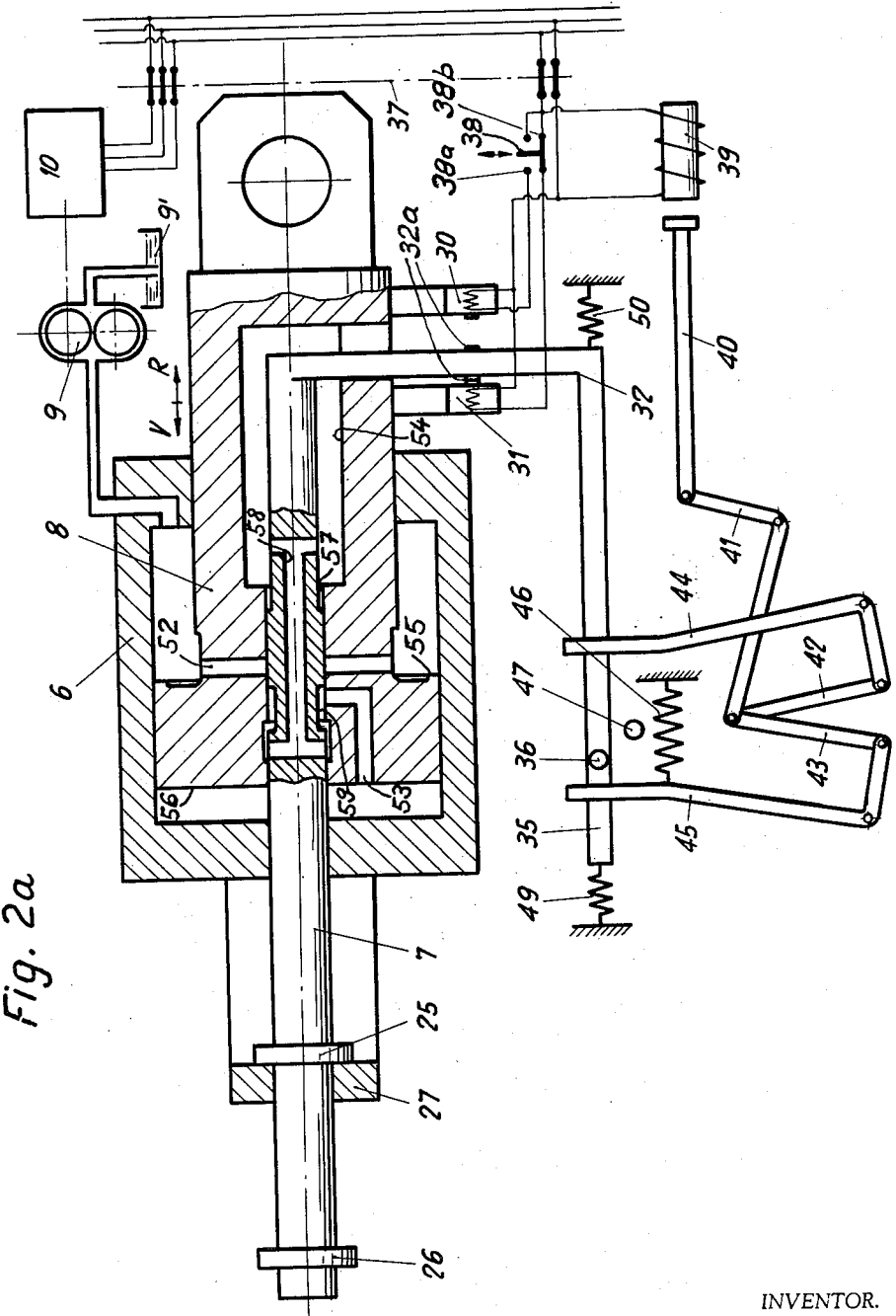

United States Patent Office 2,985,144
Patented May 23, 1961

::::

2,985,144

SERVO SYSTEM

Karl Trippel, Balsthal, Switzerland, assignor to Gesellschaft der Ludw. von Roll'schen Eisenwerke A.G., Gerlafingen, Switzerland, a Swiss company Filed Mar. 26, 1956, Ser. No. 573,861

Claims priority, application Switzerland Mar. 29, 1955

8 Claims. (Cl. 121—41)

This invention relates to a servo system, and in particular to a servo system for the control of and hydrostatic transmissions for effecting oscillatory reciprocal movements of adjustable stroke frequency and magnitude.

Transmissions of this type are, by way of example, required for use in certain types of machine tools, such as planing and grinding machines, in which the tool and the work holder or table execute to and fro longitudinal movements relative to one another. It is usually necessary, in such a case, that the speeds of movement of the displaced machine part both during its forward or operating and return or idle strokes be of different magnitudes.

It is furthermore especially desirable to maintain the reversing time intervals at the beginning and at the end of the forward strokes as small as possible. With electric motors or like drive means of known construction designed for this purpose, reversing intervals on the order of magnitude of one second have been attained which, however, in certain applications must be considered as undesirably large.

It is, therefore, an important object of the present invention to provide means facilitating performance of workpiece shaping or machining operations of various types involving relative oscillatory reciprocal movement between a working tool and a work table supporting said workpiece.

Another object of the present invention is to provide means contributing to carrying out operations of the aforesaid kinds in a highly efficacious manner through the intermediary of an infinitely variable transmission connected between the driven machine part and the drive means therefor, whereby reversal of the direction of said relative movement may be effected without interrupting the action of said drive means.

A further object of the present invention is, consequently, the provision of means affording a hydrostatic transmission and a control arrangement therefor enabling the attainment of relative oscillatory longitudinal or reciprocal movements of variable or adjustable stroke frequency and magnitude between two cooperating machine parts or elements, the entire system being used in conjunction with a continually and unidirectionally running drive motor.

It is still a further object of the present invention to provide means contributing to hydraulic transmissions capable of effecting reversals of the directions of movement of a reciprocally oscillating body, driven by continuously and unidirectionally running motor means, in minimum intervals of time without necessitating disengagement of the motor means from the driven body.

It is also an object of the present invention to provide means redounding to greatly simplified yet highly efficient transmissions of the above-described type which are easily and inexpensively manufactured and installed and which are furthermore completely safe both to the operator thereof and to the driving and driven elements connected thereto.

These and other objects of the invention will become further apparent from the following detailed description, reference being made to the accompanying drawings showing preferred embodiments of the invention.

In the drawings:

Fig. 2a is an enlarged sectional schematic illustration of a portion of the assembly shown in Fig. 2.

Figure 1:
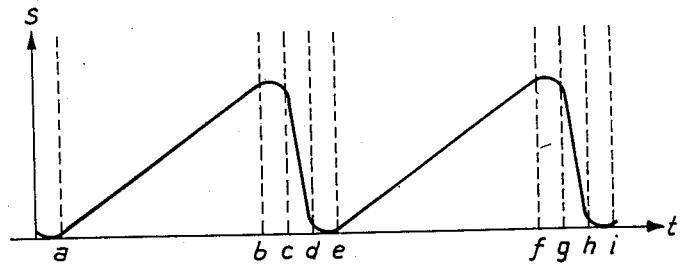
Fig. 1 is a displacement-time graph representing a desired oscillatory reciprocal movement.

Referring first to Fig. 1, it will be seen that the oscillatory reciprocal or longitudinal movement to be obtained by means of a driving system or transmission according to the present invention may be graphically represented by a plot of the displacement $s$ against the time $t$.

More particularly, the operating or forward strokes, which take place during the time intervals from $a$ to $b$ and from $e$ to $f$, as well as the return or idle strokes, which take place during the time intervals from $c$ to $d$ and from $g$ to $h$, are carried out at substantially constant although different speeds. The reversing intervals $b$ to $c$, $d$ to $e$, $f$ to $g$, and $h$ to $i$ between these strokes, however, should be as small as possible. Through the use of the transmission more fully described hereinafter, it has become feasible to obtain reversing time intervals ranging between 0.05 and 0.4 second.

Figure 2:
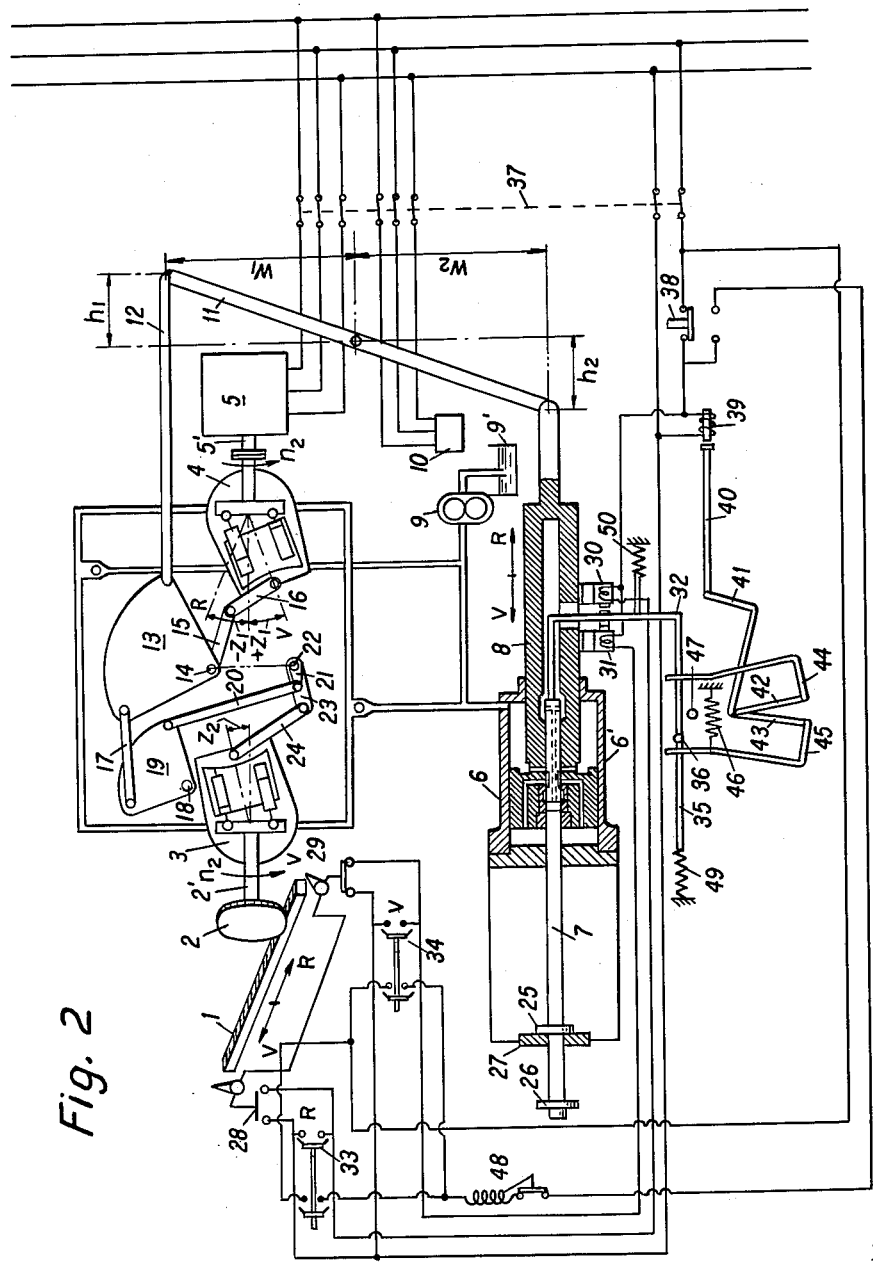
Fig. 2 is a partly sectional schematic illustration of a drive system including a hydrostatic transmission constructed in accordance with the present invention.

Referring now more particularly to Fig. 2, the machine element to be reciprocally displaced in an oscillatory manner is provided with a rack 1 meshing with a drive gear 2. The gear is driven by means of a continuously and unidirectionally rotating electric motor 5 through the intermediary of a hydrostatic transmission consisting of two axial piston pumps 3 and 4.

The two axial piston pumps, of which the one designated by the numeral 3 operates as a hydraulically driven motor while the one designated by the numeral 4 operates as a pump for the hydraulic medium, e.g. oil, are known constructions and continuously adjustable or infinitely variable as regards their operating strokes. The stroke change is effected through pivotal displacement of the housing of the pump 4 through an angle $+z_1$ and of the housing of the motor 3 through an angle $+z_2$ with respect to the common axis of the driving or input shaft 5′ and the driven or output shaft 2′.

In the position of the system illustrated in Fig. 2 and when the drive shaft 5′ of the pump 4 is rotated at $n_1$ revolutions per minute, the output shaft 2′ of the motor 3 is rotated in the same sense at $n_2$ r.p.m., which effects a forward movement of the rack 1 in the direction of the arrow V. If the housing of the pump 4 is then pivoted or tilted from its "V" position corresponding to the angle $+z_1$ into its "R" position corresponding to an angle $-z_1$, there results such a change in the rotational speed of the output shaft and thus of the gear 2 as to effect a return movement of the rack in the direction of the arrow R.

The r.p.m. ratio $n_1:n_2$ and the torque ratio $M_1:M_2$ between the driving and driven shafts are determined as functions of the stroke volume ratio $V_1:V_2$ of the pump 4 and the motor 3, respectively. As indicated hereinabove, it is preferred that the pump 4 and motor 3 are constituted by identical axial piston arrangements.

The respective relationships are represented by the equations $$\frac{n_2}{n_1} = k_q \cdot \frac{V_1 \cdot \sin z_1}{V_2 \cdot \sin z_2}$$

and $$\frac{M_2}{M_1} = k_p \cdot k_m \cdot \frac{V_2 \cdot \sin z_2}{V_1 \cdot \sin z_1}$$

wherein $k_q$, $k_p$ and $k_m$ are factors or expressions of the efficiency of the system as a function of the quantity of hydraulic fluid, the pressure on the fluid, and the mechanical arrangement employed.

Figure 3:
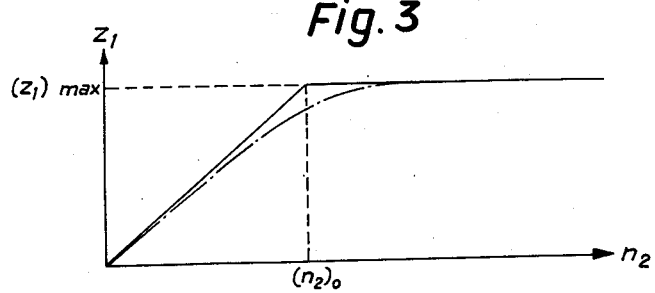
Figs. 3 to 5 are diagrams or graphs representing various aspects of the operation of the transmission shown in Fig. 2.
Figure 4:
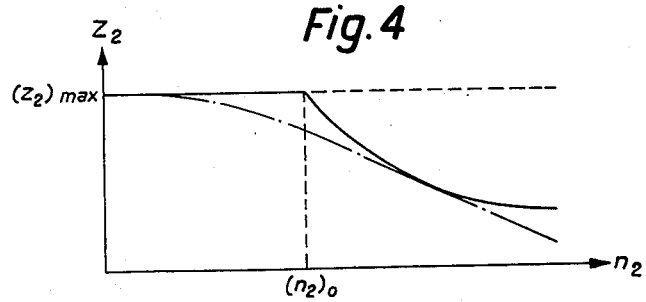

In order to obtain a linear increase of the rotational speed $n_2$ by means of the illustrated hydrostatic transmission, the primary part of which is the pump 4 and the secondary part of which is the motor 3, the angle $z_1$ must be changed in accordance with the solid line curve shown in the graph of Fig. 3, while the angle $z_2$ must be changed in accordance with the solid line curve shown in the graph of Fig. 4.

Figure 5:
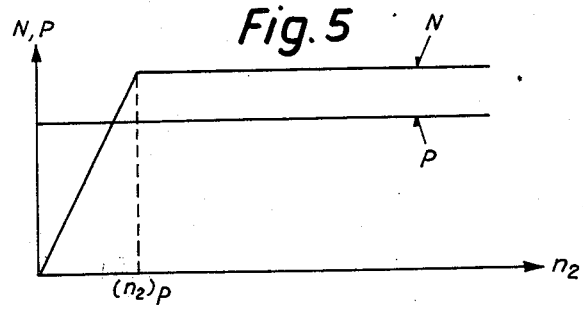

In that event, the efficiency N and the pressure P of the hydraulic medium follow respective courses as indicated in the graph of Fig. 5. The highest permissible pressure P thus determines the smallest rotational speed $(n_2)_p$ at which the transmission can operate at full efficiency N.

Referring again to Fig. 2, the control of the hydrostatic transmission so as to effect an oscillatory movement corresponding to the displacement-time diagram of Fig. 1 is effected by means of a hydraulic servomotor 6 actuated by a pressure fluid derived from a suitable reservoir or like source 9'. The servomotor 6 includes a main piston 8 and an auxiliary piston 7 for controlling the action of the main piston.

As will be seen from Fig. 2a, the main or servo piston 8 has two oppositely arranged work surfaces 55 and 56, work surface 55 being considerably smaller than work surface 56. Work surface 55 faces towards a first side of the cylinder 6, to which side the source of fluid pressure, i.e. a feed pump 9 is connected. In the servo piston a first transfer duct 52, connects the smaller work surface thereof with an axial bore 57 extending through this servo piston and at a first location thereof. The auxiliary piston, which is slidably arranged in bore 57 comprises an exhaust duct 58. The latter is in connection with an exhaust chamber 54, arranged in servo piston 8, in all positions of the auxiliary piston 7 relative to the servo piston 8. A second transfer duct 53 connects the larger work surface of the servo piston 8 with the bore 57 at a second location thereof. In the position of auxiliary piston 7 relative to servo piston 8 shown in Figs. 2, 2a the second transfer duct 53 is connected with the exhaust duct 58 via a recess 59 provided circumferentially of the auxiliary piston 7. This relative position of servo piston will be termed hereinafter as "second location," and corresponds to a movement of servo piston 8 towards the second side of cylinder 6. In a first location of auxiliary piston 7, the recess 59 connects transfer ducts 52 and 53 with each other over their full cross-sections so that servo piston 8 will be moved towards the first side of cylinder 6. In an intermediate or third location between the first and second locations ducts 52 and 53 will be connected via recess 59 only over a part of the cross-section of duct 52, so that the servo piston 8 will be stationary due to the fact that the products of pressure and surface area on each side of the servo piston will be equal, the reduction of the cross-section mentioned above causing a pressure drop at the larger work surface 56.

The hydraulic fluid or medium for the servomotor is subjected to the requisite pressure by means of a feed pump 9 which is driven by a separate electric motor 10 although, alternatively, the pump 9 may be driven by the main drive motor 5. The same pressure medium is also employed in effecting the power transmission from the primary to the secondary part of the transmission.

The main piston 8 moves in one direction or another ("V" or "R") depending on the postition of the auxiliary piston 7, the movements of the piston 8 being transmitted to a push rod or like regulating or control bar means 12 by means of a balanced beam 11 pivoted intermediate its ends so as to provide arms with lengths $w_1$ and $w_2$, respectively. Upon longitudinal displacement of the push rod 12, a circular sector 13 connected thereto is rotated or pivoted on an axle 14 to which a lever 15 is fixedly connected, the latter in turn being connected to the housing of the primary transmission part or pump 4 by means of a link 16.

As will be readily realized, a displacement of the main piston 8 through a distance $h_2$ effects a longitudinal displacement of the control bar or rod 12 through a distance $h_1 = h_2(w_1/w_2)$. This results in a rotation of the pump 4 through an angle $\pm z_1$ according to the relationship $$h_1 = C(\sin z_1)$$

in which C is a constant depending on the dimensions of the control elements 13, 15 and 16.

The movement of the circular sector 13 is simultaneously transmitted via a pivotally attached link rod 17 to a circular sector 19 pivotally or swingably mounted on an axle 18 and thence over a further link 20 to a lever 21. The lever 21 is rigidly connected to a rotatable axle 22 which also carries a lever 23 having a link 24 connected thereto, by means of which link the swinging or pivotal movement of the motor 3 is effected.

In this manner, the angle $z_2$ may be determined from the relation $$z_2 = A + B\sqrt{1 - (a \cdot h_1)^2}$$

in which A, B and $a$ are invariable quantities determined by the structural characteristics of the transmission. With identical primary and secondary transmission parts 4 and 3, the stroke volumes $V_1$ and $V_2$ of the latter are equal, as a result of which $$n_2 = n_1 \cdot k_q \cdot \frac{\sin z_1}{\sin z_2}$$

whereby $$n_2 = n_1 \cdot k_q \cdot \frac{h_1}{C \cdot \sin [A + B\sqrt{1 - (a \cdot h_1)^2}]}$$

Since the quantities $k_q$, A, B, C and $a$ are constant for any given construction of the transmission, and since the rotational speed $n_1$ of the electric motor 5 remains substantially constant, the rotational speed $n_2$ of the output shaft 2' depends solely on the displacement $h_1$ of the control or push rod 12 or on the related axial displacement $h_2$ of the main servomotor piston 8.

Preferably, the above described transmission elements are so dimensioned that upon swinging or pivoting of the primary transmission part 4 through a maximum angle $z_1$ of $\pm 25°$ there results an angular displacement of the secondary transmission part 3 ranging from a maximum value of $+z_2 = 25°$ to a minimum value of $z_2$ which is always greater than zero.

With such a control arrangement, the transmission parts operate in accordance with the broken line curves shown in the graphs of Figs. 3 and 4, corresponding to the relations $$z_1 = \frac{C_1 \cdot n_2 + n_2 \sqrt{C_1^2 - (C_2 \cdot n_2^2)}}{C_3 \cdot (C_4 + C_5 \cdot n_2^2)}$$

and $$z_2 = \frac{C_1 + \sqrt{C_1^2 - (C_2 \cdot n_2^2)}}{C_4 + C_5 \cdot n_2^2}$$

in which the quantities $C_1$ to $C_5$ are constants determined by the constructional characteristics of the transmission.

The greatest deviation or variation of the actual operation of the transmission from the desired operation thus occurs at a rotational speed $(n_2)_0$, as may be seen from Figs. 3 and 4. However, through appropriate selection of the lever transmission ratios, this deviation or difference may be kept as small as possible so that the reduction of the torque transmitted at this speed becomes negligible.

The displacement stroke $h_2$ of the main piston 8, which determines the angles $z_1$ and $z_2$ of the transmission parts and thus the output rotational speed $n_2$, may be adjusted or regulated to any desired value by means of a pair of lugs or projections, such as collars 25 and 26, located on and axially spaced along the control piston 7, said lugs being adjustably carried by said control piston and cooperating with an abutment member or plate 27.

When the main piston 8 and the control or auxiliary piston 7 move together in one and the same direction, which, of course, can only be the case at the reversal points of the rack 1, the control piston 7 is longitudinally displaced relative to the main piston as soon as one of the lugs 25 or 26 engages the member 27. This effects connection of either the transfer ducts 52 and 53 with each other or of duct 53 with duct 58, thus draining the pressure medium fed to the servomotor 6 into exhaust chamber 54, so that the main piston 8 immediately comes to rest. The end positions of the piston 8 are thereby determined.

The pivotal displacement of the transmission parts 3 and 4 is terminated simultaneously, whereby the rotational speed $n_2$ and thus the linear speed of movement of the rack 1 in the appropriate direction are fixed or rendered constant. The servomotor 6 is again actuated only when the rack 1 reaches one or the other of its reversal points.

When the main piston 8 is in its middle or intermediate position in the cylinder 6' of the servomotor 6, the primary transmission part 4 is located at an angle $z_1=0°$, the rotational speed $n_2=0$ and the rack 1 is stationary or at rest. Depending on whether the distances between the lugs or collars 25 and 26 and the abutment member 27, measured from this null position of the main piston, are equal or different in magnitude, the rack moves alternately in both directions with either the same velocity or with different velocities.

In order to reverse the operation of the transmission at the reversal points of the rack 1, the latter is arranged to actuate one or another of a pair of limit switches 28 and 29 so as to close a circuit to the corresponding one of a pair of stroke-initiating magnets 30 and 31. The switches 28 and 29 are ganged or interlocked by any suitable means such as a rocker or tumbler arrangement (not shown) in such a manner that when the switch 29 is closed the switch 28 is open, and vice versa. In any event however, each of the switches remains closed until the other one is actuated.

The stroke-initiating magnets 30 and 31 are rigidly mounted on the main piston 8 of the servomotor 6 and are located on opposite sides of linkage rod means 32 connected to the control piston 7. Accordingly, when the rack 1 actuates one of the limit switches 28 and 29, the corresponding magnet 30 or 31 is energized to attract the rod means 32 having magnetic means 32a thereon and to thereby displace the control piston 7 from the central or intermediate location in which it is originally disposed and into one or the other of its terminal or end positions against the action of either the spring 49 or the spring 50.

This effects an immediate actuation of the main piston 8 to cause the latter to reverse the operation of the transmission through the intermediary of the push rod member 12. This, in turn, effects rotation of the output shaft 2' and gear 2 in a direction opposite to the previous direction of rotation and thus a reversal of the displacement of the rack 1 and the machine element or part connected thereto.

As a further safety measure against overtravel or excessive displacement of the rack 1, there are connected in parallel with the limit switches 28 and 29, which may be arranged for displacement or adjustment longitudinally of the path of rack movement, i.e. of the supporting means for the rack, so as to permit adjustment of the reversal points of the rack, two safety switches 33 and 34, respectively.

These safety switches are automatically actuated at the end of the maximum possible stroke of the rack 1 in the event that the corresponding limit switch was incorrectly positioned or failed to operate properly.

When the electric motor 5 is first switched on, no displacement or movement of the rack 1 should, of course, take place, to which end the primary transmission part or pump 4 must be located in its middle position with the angle $z_1=0°$. This same condition must exist whenever the rack 1 is to be temporarily maintained at rest while the motor continues running.

Accordingly, a push rod 35 is rigidly connected to the linkage rod means 32 of the control piston 7 and provided with a projection 36, the purpose of which is more fully explained hereinbelow.

When the machine is in operation, as shown in Fig. 2, the starting push-button switch 38 is closed and a magnet 39 energized so as to attract a movable rod 40. The latter is connected with a pair of links 42 and 43 by means of a bell crank lever 41 to effect spreading of a pair of arms 44 and 45 in a scissor-like manner against the action of a tension spring 46 and into the position shown in Fig. 2.

If the rack is to be temporarily maintained at rest, the starting switch 38 is moved so as to interrupt or open the circuit to the magnet 39, whereby the displacement rod 40 is released and the arms 44 and 45 are caused to approach one another by means of the spring 46. As a result, the projection 36 is engaged by the upper end of the scissor arm 45 and displaced, together with the rod 35, the linkage rod means 32 and the control piston 7, in the direction of a stop 47, whereby the main piston 8 is displaced in the same sense or direction.

As soon as the projection 36 reaches the stop 47, the movement of the rod 35 and thus of the control piston 7 is terminated. The main piston 8 is, therefore, likewise brought to rest, it being possible through adjustment of the stop 47 to ensure that at this rest or intermediate position the primary part 4 of the transmission is so located that the angle $z_1=0°$.

It will, consequently, be readily understood that this position is brought about automatically whenever the starting switch 38 is opened, so that at such time the motor 5 and even the motor 10 may be switched off and on again, as desired. For the sake of greater operational safety, moreover, the switch 38 may be so constructed that it can be closed only when the electric motor 5 is started and running.

Whenever the projection 36 coincides or registers with the stop 47, furthermore, the servomotor 6 and thus the transmission remain in the above-described rest position, even when the starting switch 38 is closed, the magnet 39 energized and the scissor-like arms 44 and 45 spread apart. In order to move the primary transmission part 4 through a predetermined angle $z_1$, one of the safety switches 33 or 34 or a corresponding control push-button switch connected in parallel therewith must first be actuated.

One of the magnets 30 and 31 is thus energized and effects an appropriate displacement of the control piston 7. The above-described oscillatory movement of the rack 1 then starts and becomes automatically stabilized until the transmission part 4 is again forced into the position $z_1=0°$ through opening of the starting switch 38.

In certain applications, for example, in a planing machine, it is essential that the proper machine element connected to the rack 1 may be moved in one or another direction for a small period of time after which said element is to be again brought to rest. By way of example, it may be required that the work table be displaced for a short time and at a reduced speed.

To facilitate this, the electric safety switches 33 and 34 are constructed as double on-off switches while the switch 38 is constructed as a reversing switch having contacts 38a and 38b. In the illustrated position of the switch 38, the machine is in a normal operating condition.

When the switch 38 is pressed downwardly, the magnets 30, 31 and 39 are deenergized and the angle between the axis of the primary transmission part 4 and the common axis of the input and output shafts 5' and 2' is reduced to zero. Despite continued running of the motor 5, therefore, the machine remains at rest.

Upon actuation of one of the two switches 33 and 34, the magnet 39 and the appropriate one of the stroke-initiating magnets 30 and 31 are energized. The servomotor 6 begins to operate and to accelerate the work table of the machine. In order to ensure that the servomotor piston 8 does not attain a terminal position corresponding to engagement between the abutment member 27 and one or the other of the projections or collars 25 and 26, so as to prevent displacement of the work table at the high speed corresponding to such end position, a time relay 48 is provided which after an adjustable interval of time opens the current circuit.

When the magnets are thus again deenergized, the main piston 8 is drawn to its middle position and the angular position of the primary transmission part 4 is reduced to zero so as to stop the machine or, more specifically, so as to stop the rack 1 and the work table connected thereto. The machine may, of course, be brought to rest in a similar manner by releasing or opening the previously actuated switch 33 or 34.

During operation of the device, means 39 must be maintained in energized position so as to maintain members 44 and 45 apart. If the rack 1 is to be put to rest, the piston 8 must be brought into its intermediate position which may be done by deenergizing means 39. Deenergizing must always be effected manually by means of switch member 38 unless the whole system is stopped by means of switch 37. To this end switch member 38 has in addition to its two contact positions an intermediate inoperative position not shown in the drawings.

An additional purpose of switch member 38 is to permit starting of the operation of the device, that is, initiating the displacement of servo piston 8, to provide a means for manually interrupting the operating sequence which as indicated above may be done by bringing switch member 38 into its inoperative position.

Thus it will be seen that, in accordance with a broad view of the invention, there has been provided a hydrostatic transmission having a rotatable input part 4 and a rotatable output part 3 for use with unidirectionally running drive means 5 to produce an oscillatory movement of an element 1 connected with said output part. The transmission includes a servomotor 6 provided with a pressure-actuated main piston 8 operatively connected (via the means 11, 12, 13, 19 etc.) to the input and output parts 4 and 3.

Electrical means 28 and 29 are provided at predetermined terminal, reversing points of the path of movement of the element 1 for actuation by the latter to alternately energize electromagnetic means 30 and 31 operable to displace a control piston 7 associated with the main piston 8 in such a manner as to initiate a reversal of the direction of movement of the element 1 without necessitating interruption of the operation of the drive means 5 whenever said element arrives at one or the other of the terminal points defined by the electrical means 28 and 29.

Actuation of the main piston 8 by the control piston 7 further predetermines the ratio between the rotational speeds of the input and output parts. Finally, there are provided electric current-controlled means 39, 40, 45 etc. to displace the control piston in such a manner as to reduce to zero the torque transmitted from the input part of the transmission to the output part.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A servo system comprising a cylinder, piston means displaceable in said cylinder and having a bore therein, a fluid pressure source connected to said cylinder for displacement of said piston means, valve means for influencing said fluid pressure in said cylinder, said valve means being slidably arranged in said bore and displaceable with said piston means, and electromagnetic actuating means for said valve means, said actuating means being supported by said piston means for displacement therewith and adapted to cause sliding movement of said valve means in said bore relative to said piston means to thereby influence said fluid pressure in said cylinder and consequently said displacement of said piston means.

2. A servo system comprising a cylinder, first piston means displaceable in said cylinder between predetermined positions and having a bore, a fluid pressure source connected to said cylinder for displacement of said first piston means, second piston means slidably arranged in said bore of said first piston means for influencing said fluid pressure in said cylinder, duct means in at least one of said first and second piston means for transferring said fluid pressure, said first and second piston means being arranged for cooperation with each other to control said duct means, electromagnetic actuating means for said second piston means, supported by said first piston means for displacement therewith, and stop means for said second piston means and independent from said first piston means, said actuating means and said stop means being adapted to cause sliding movement of said second piston means in said bore relative to said first piston means, to thereby effect said cooperation for control of said duct means, whereby said displacement of said first piston means by said fluid pressure may be effected by said actuating means and limited in said predetermined positions by said stop means, via said second piston means.

3. A servo system comprising a cylinder, first piston means displaceable in said cylinder between predetermined positions and having a bore, a fluid pressure source connected to said cylinder for displacement of said first piston means, second piston means slidably arranged in said bore of said first piston means for influencing said fluid pressure in said cylinder, duct means in at least one of said first and second piston means for transferring said fluid pressure, said first and second piston means being arranged for cooperation with each other to control said duct means, electromagnetic actuating means for said second piston means, supported by said first piston means for displacement therewith, stop means for limiting the displacement of said first piston means in said predetermined positions, said actuating means being adapted to cause sliding movement of said second piston means in said bore relative to said first piston means, to thereby effect said cooperation for control of said duct means, whereby said displacement of said first piston means under said fluid pressure may be influenced by said actuating means via said second piston means.

4. A servo system for controlling a reversible hydrostatic transmission; comprising a cylinder having a first and a second side, a source of fluid pressure connected to said first side of said cylinder to deliver fluid pressure thereto, a servo piston displaceable by said fluid pressure in said cylinder between a predetermined intermediate position and two predetermined end positions, said servo piston having a bore and two oppositely arranged work surfaces, one of said work surfaces being smaller than the other of said work surfaces, said smaller work surface facing toward said first side of said cylinder, said servo piston further having a first transfer duct extending from adjacent said smaller work surface into said bore at a first location and a second transfer duct extending from adjacent the larger work surface into said bore at a second location spaced from said first location, an auxiliary piston slidable in said bore between said first and second location and having an exhaust duct connected with said second transfer duct when in said second location and a recess connecting said first transfer duct with said second transfer duct when in said first location, electromagnetic means supported by said servo piston and adapted to slide said auxiliary piston between said first and second locations to cause displacement of said servo piston, stop means connected to said cylinder and adapted to cooperate with said auxiliary piston when said servo piston is displaced towards said end positions to thereby limit the displacement thereof, and means for returning said servo piston into said intermediate position, said returning means, including lever means adapted for engagement with and disengagement from said auxiliary piston, spring means connected to said lever means to urge the latter into engagement with said auxiliary piston, and further electromagnetic means in operative connection with said lever means to disengage the latter from said auxiliary piston against said spring means, said lever means when urged by said spring means sliding said auxiliary piston into a respective one of said first and second locations to initiate displacement of said servo piston into said intermediate position.

5. A servo system according to claim 4, including rod means of magnetic material extending from said auxiliary piston, actuable electrical means connected to said electromagnetic means, said electromagnetic means comprising a pair of electromagnets spaced from one another longitudinally of said auxiliary piston to alternately attract the latter upon energization due to actuation of said electrical means to thereby reverse the displacement of said servo piston.

6. A servo system according to claim 5, including stationary stop means, said rod means being provided with a projection engageable by said lever means, said lever means being arranged for abutment against said stationary stop means upon displacement together with said auxiliary piston by said spring means in deenergized condition of said further electromagnetic means, whereby upon abutment of said lever means against said stop means said servo piston is returned into its intermediate position.

7. A servo system according to claim 6, said stop means being adjustable longitudinally of said auxiliary piston intermediary position so that said main piston may be adjusted.

8. A servo system comprising a cylinder, first piston means displaceable in said cylinder between three predetermined positions and having a bore, a fluid pressure source connected to said cylinder for displacement of said first piston means, second piston means slidably arranged in said bore of said first piston means for influencing said fluid pressure in said cylinder, duct means in at least one of said first and second piston means for transferring said fluid pressure, said first and second piston means being arranged for cooperation with each other to control said duct means, actuating means for said second piston means supported by said first piston means for displacement therewith, means limiting said displacement of said first piston means, said limiting means being arranged to contact said second piston means in two of said predetermined positions of said first piston means, said two positions forming extreme positions, and means for returning said first piston means into a third of said predetermined positions intermediate said two extreme positions, said returning means being adapted to operatively engage said second piston means, to cause sliding movement thereof in said bore relative to said first piston means to thereby effect said cooperation for control of said duct means, whereby said first piston means may be displaced by said fluid pressure into said third predetermined position.

References Cited in the file of this patent

UNITED STATES PATENTS

| | | |
|---|---|---|
| 773,365 | Atkins | Oct. 25, 1904 |
| 1,407,047 | Trowbridge | Feb. 21, 1922 |
| 1,851,816 | Dieter | Mar. 29, 1932 |
| 2,088,520 | Huguenin | July 27, 1937 |
| 2,110,622 | Fischel | Mar. 8, 1938 |
| 2,274,226 | Wiedmann | Feb. 24, 1942 |
| 2,385,069 | Ferris | Sept. 18, 1945 |
| 2,446,149 | Wells | July 27, 1948 |
| 2,466,041 | Peoples et al. | Apr. 5, 1949 |
| 2,553,286 | Tyler | May 15, 1951 |
| 2,615,466 | Garde | Oct. 28, 1952 |
| 2,690,192 | Dannhardt | Sept. 28, 1954 |

FOREIGN PATENTS

| | | |
|---|---|---|
| 868,247 | France | Sept. 22, 1941 |